455-603 AU 233 EX
FIP8106 OR 3,691,387

United States Patent [15] 3,691,387
DeLange [45] Sept. 12, 1972

[54] ERROR-CORRECTING OPTICAL PCM DETECTOR

[72] Inventor: Owen Edward DeLange, Rumson, N.J.

[73] Assignee: Bell Telephone Laboratories, Incorporated, Murray Hill, N.J.

[22] Filed: May 6, 1971

[21] Appl. No.: 140,778

Related U.S. Application Data

[63] Continuation-in-part of Ser. No. 691,764, Dec. 19, 1967, abandoned.

[52] U.S. Cl.............250/199, 325/41, 340/146.1 AG
[51] Int. Cl..............................................H04b 9/100
[58] Field of Search.............250/199, 209, 220, 50 S; 325/41, 30, 163, 320; 178/66 R, 67, 66 A

[56] References Cited

UNITED STATES PATENTS 2,892,888 6/1959 James...........340/146.1 AG X
3,284,632 11/1966 Niblack.....................250/199
3,430,047 2/1969 Hurkamp...................250/199

*Primary Examiner*—Robert L. Griffin
*Assistant Examiner*—Kenneth W. Weinstein
*Attorney*—Arthur J. Torsiglieri

[57] ABSTRACT

The application describes an arrangement for correcting detection errors in an optical PCM receiver. It is recognized that there is a finite probability that an incident low level pulse of light will not result in an output from an optical detector. Similarly, in the presence of background light, there is a finite probability that a spurious output pulse will be produced. In the detector to be described, the incident optical signal, which has been encoded in the so-called "even-parity" coding system, is converted into two complementary "on-off" PCM signals, each of which is coupled to a separate detector. The baseband output signals are then compared and any detection errors corrected by deleting spurious pulses inserted by one or the other detectors, or by inserting pulses omitted by one or the other detectors.

2 Claims, 4 Drawing Figures

INVENTOR
O. E. DE LANGE
BY
Sylvan Sherman
ATTORNEY

ERROR-CORRECTING OPTICAL PCM DETECTOR

CROSS REFERENCE TO RELATED APPLICATION

This invention, which is a continuation-in-part of copending application Ser. No. 691,764, filed Dec. 19, 1967, now abandoned, relates to error-correcting arrangements for use in optical, pulse code modulated (PCM) communication systems.

BACKGROUND OF THE INVENTION

Pulse code modulation (PCM) is a widely used means of accurately and quickly transmitting information. In particular, the binary PCM system, which utilizes only two different conditions of the transmitted signal, is of particular interest insofar as it simplifies the detection process, and affords a higher degree of reliability than other systems in which many signal states are permitted.

It will be readily appreciated, however, that the reliability of such a system is limited by the receiver's ability to distinguish between the two binary states of the signal. That is, in an "on-off" system, the detector must be capable of properly indicating whether a signal is present, thereby identifying the "on" signal state, or whether no signal is present, thereby identifying the "off" signal state. This becomes a considerable problem at very low signal levels since there is a finite probability that the incidence of a low level pulse of light upon an optical detector will not result in an output from the detector. On the other hand, in the presence of background light, there is some finite probability that an output will be obtained from the detector when, in fact, there is no input signal pulse present. As a consequence of the above, some means of error identification and some means of error correction are commonly provided in PCM systems.

One of the many know types of error-correcting systems is the so-called "even-parity" coding system described by R. W. Hamming et al in U.S. Pat. No. Re 23,601. In accordance with the even-parity system, each binary word includes an even number N of bit positions, of which the first N—1 positions are used to transmit information, while the remaining bit position is used for error coding. Within the framework of the even-parity coding system, it is the object of the present invention to recognize both errors of omission and errors of insertion introduced by the detector, and to correct such errors automatically by inserting omitted signal pulses in their proper sequence, and by deleting spurious pulses introduced by the detectors.

SUMMARY OF THE INVENTION

In accordance with the present invention, the received even-parity, binary-encoded optical signal is converted into two, complementary "on-off" type optical pulse trains, characterized in that an "on" state in any bit position of one of the signal pulse trains is represented by an "off" state for the corresponding bit position of the other pulse train, and vice versa. The two signals are then detected by means of separate photodetectors to produce two, complementary baseband pulse trains. Detection errors are recognized by counting the number of pulses in each pulse train. If either of these counts is not even, it is known that a detection error has been made by the detector having an odd bit count in a particular word. The specific bit position in error is determined by comparing the outputs from the two detectors. Whenever one detector indicates a space and the other a pulse, no error is indicated. If, however, both detectors simultaneously indicate spaces, an error of omission has been committed by the detector producing the odd number of pulses. This error is then corrected by inserting a pulse in the bit position in error. Similarly, if both detectors simultaneously indicate pulses, an insertion error has been committed by the detector producing the odd number of pulses. This error is then corrected by deleting the spurious pulse from the bit position in error.

The corrected pulse train and its complementary pulse train are then advantageously combined to produce a corrected output pulse train.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
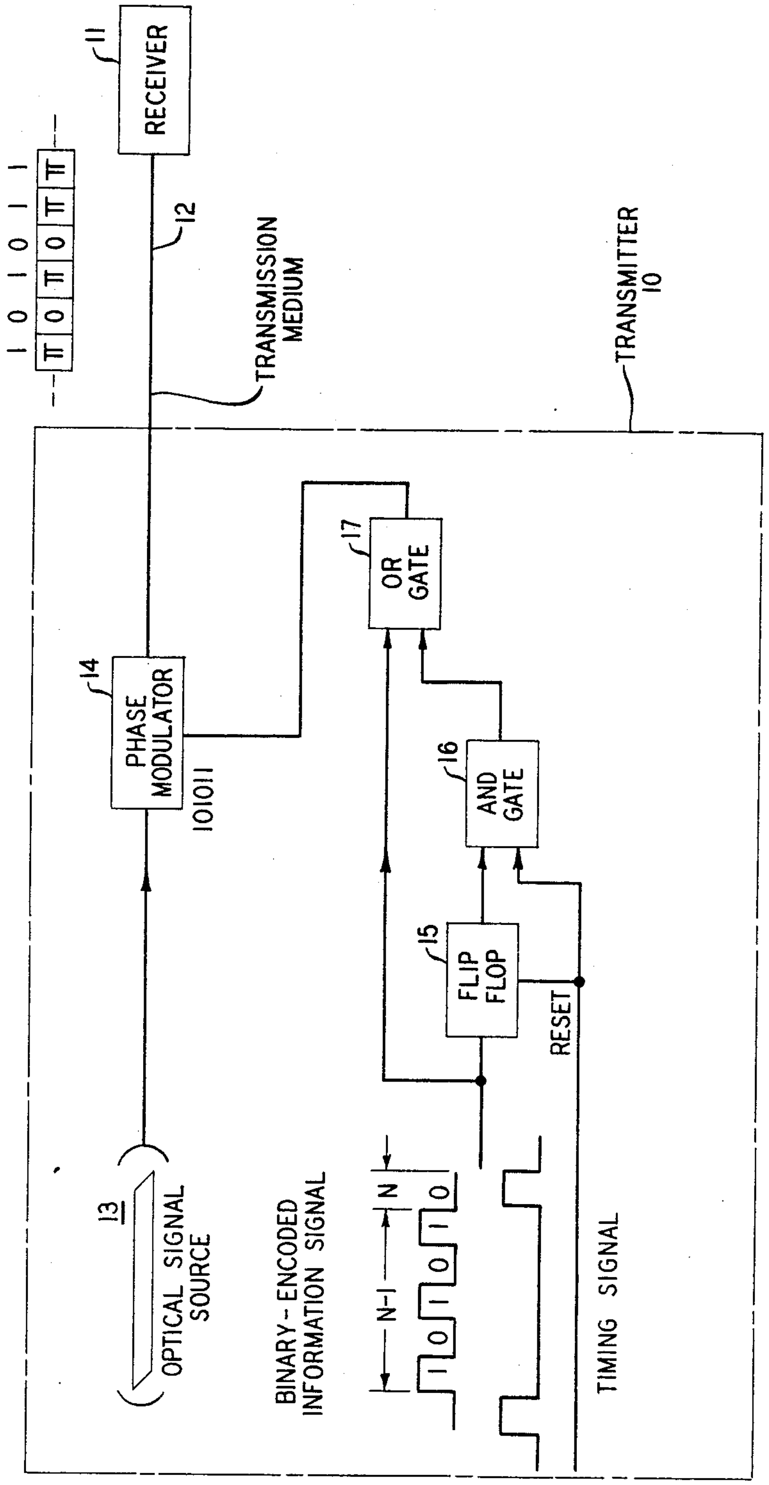
FIG. 1 shows, in block diagram, an optical PCM communication system.

Referring to the drawings, FIG. 1 shows, in block diagram, an optical, pulse code modulated (PCM) communication system comprising a transmitter 10, a receiver 11, and a transmission medium 12 connecting the former to the latter.

Transmitter 10, shown in some detail, produces a binary-encoded optical signal which is communicated to receiver 11 wherein the modulating information signal is recovered. For very low level optical signals, however, there is a finite probability that the photodetector will fail to produce an output signal in response to an incident pulse of light. Also, if background light is present, there is a corresponding probability that a spurious output signal will be produced when there is no input optical signal. Accordingly, some means of recognizing and correcting such detection errors are advantageously provided at the receiver.

Basic to the error recognition and correction arrangements to be described hereinbelow is the use of the so-called "even-parity" encoding system. In accordance with this system, the information to be transmitted is encoded into binary words having an even number N of time intervals, or bit positions per word. Of these, the first bit positions are used for signal information, with the remaining bit position used for error coding. In particular, in the even-parity system, the encoding is such that each word contains an even number of "ones" or pulses. That is, if the signal information in the first N—1 positions contains an even number of pulses, the $N^{th}$ bit position is a "zero" or space. If, on the other hand, the first N−1 bit positions include an odd number of pulses, an additional pulse is added to the last bit position so that there is always an even number of pulses and an even number of spaces in each transmitted word. Thus, in order to effect the necessary encoding, means are provided at the transmitter for counting the number of pulses, and for inserting an additional pulse in the last bit position if required. For purposes of explanation, a $\pi$ -modulation PCM system, using six bit words, is illustrated in FIG. 1.

In accordance with the illustrative embodiment of FIG. 1, transmitter 10 comprises an optical signal source 13, a phase modulator 14, and logic circuitry including a flip-flop 15, an AND gate 16, and an OR gate 17.

In operation, the binary-encoded information signal is simultaneously coupled to flip-flop 15 (which serves as a binary counter) and to one of the input ports of OR gate 17. The other input port of OR gate 17 is coupled to the output port of AND gate 16. The latter, however, is disabled during a time corresponding to the first N−1 bit positions and, hence, the OR gate merely couples the information signal to modulator 14. At the same time, the flip-flop is counting the number of pulses contained in the signal. Since each pulse produces a change of state in the flip-flop, an even number of pulses leave the flip-flop in the same state at the end of the $N-1^{st}$ pulse as it was at the beginning of the word. In this case, the application of a reset pulse during the $N^{th}$ bit position does not result in any further change of state and, hence, there is no output from the flip-flop. If, however, the input signal includes an odd number of pulses, the flip-flop will be in its other state at the end of the $N-1^{st}$ bit position, such that the application of the reset pulse will produce an output pulse which is added to the signal pulse stream through OR gate 17. This added pulse is inserted in the $N^{th}$ bit position reserved for this purpose. As an example, the six bit word 101010 illustrated in FIG. 1 includes a five bit information signal 10101 which has an odd number of pulses. Accordingly, a pulse is added to one sixth bit position, in the manner described, to produce the six bit, even-parity, error-encoded signal 101011.

The optical portion of the transmitter includes a laser 13, which can be any one of the many coherent optical wave sources known in the art, whose output is directed through phase modulator 14. The latter, in response to the applied information signal, imparts either a zero or a 180° relative phase shift to the optical wave, to produce a $\pi$-modulated output. Such a modulator typically comprises a crystal of electro-optic material, such as lithium tantalum, or other such material, to which a modulating voltage is applied. In a binary PCM system, one of the binary states is a space, which is indicated by the absence of voltage. Under this condition, the optical wave traverses the phase modulator and emerges with a relative phase indicated in FIG. 1 as "0" phase. Where a mark, or pulse is present, indicative of the other binary state, a voltage is impressed across the electro-optical material, altering its index of refraction and, thereby, imparting a different relative phase to the optical wave. In a $\pi$-modulated system, the difference in the two-phase shifts, corresponding to the two signal states, is 180°. Accordingly, the phases of the six bit optical signal at the output of modulator 14, corresponding to the modulating signal 101011, is represented by $\pi o \pi o \pi \pi$.

Figure 2:
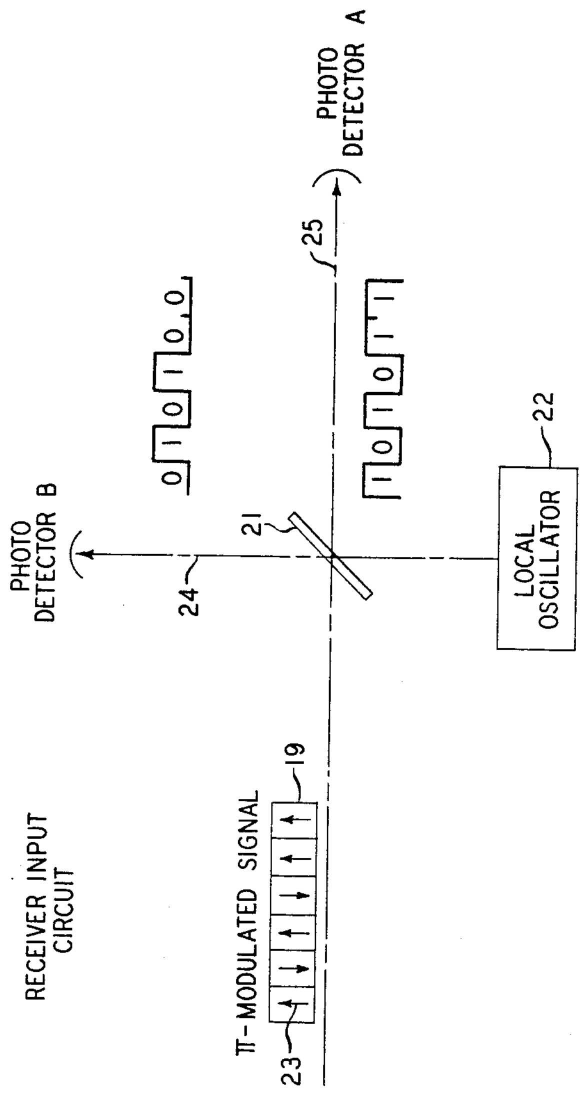
FIG. 2 shows the input circuit of an optical receiver for converting a $\pi$-modulated optical signal into two, complementary "on-off" optical pulse trains.

The optical signal modulated in the manner described, is transmitted along medium 12 to receiver 11 wherein the information is recovered. Since photodetectors respond to intensity changes rather than changes in phase, the incident $\pi$-modulated optical wave is first converted to an "on-off" type of modulation. A receiver input circuit for this purpose, as illustrated in FIG. 2, comprises a 3 db hybrid coupler 21, such as a half-silvered mirror, and a phase coherent local oscillator 22. In operation, the signal from the local oscillator 22 is incident upon the half-silvered mirror simultaneously with the incoming $\pi$-modulated signal. The oscillator amplitude is adjusted so as to be approximately equal to the amplitude of the incoming signal. The oscillator frequency is equal to that of the carrier, with the oscillator phase maintained constant and 90° ahead of one of the $\pi$-modulated states. In FIG. 2, it is assumed that at the surface of the beam splitter the phase of the local oscillator is 90° ahead of the phase state of the portion of the incident signal beam indicated by the vertical arrow 23 in the first time slot of the modulated signal representation 19. Looking now at only the initial pulse state, one result of reflection upward along path 24 is the introduction of a 90° phase lag. The local oscillator signal, on the other hand, passes undisturbed through hybrid 21 with the 90° phase lead maintained. Thus, the phases cancel and no optical pulse appears in the first pulse position on branch 24, which leads to a first photodetector B. Along branch 25, passage through hybrid 21 has no effect on the phase of the energy in time slot 23. However, the local oscillator signal, originally 90° ahead of that in slot 23, is retarded 90° upon reflection along path 25. Thus, the phases coincide, the energy is additive, and a pulse appears in the pulse train proceeding along branch 25 toward a second photodetector A. Similar analysis applied to the other phase state of the incoming wave train produces a pulse along path 24 and no pulse along path 25. Thus, the two optical pulse trains produced are complementary to each other in that a pulse in any bit position of one corresponds to a space in the corresponding bit position of the other, and vice versa.

In a simple detection system, the two optical pulse trains would be separately detected and the resulting baseband pulse trains combined after one of them had been inverted. It will be noted that by combining these two signals, a 3 db improvement in the signal-to-noise ratio is realized over either signal alone due to the independence of the noise in the respective signals. Thus, the normal 3 db penalty associated with using a hybrid coupler is avoided.

While this arrangement permits one to recognize the presence of a detection error, whenever the two baseband signals are different, it provides no way of knowing which detector made the error, nor how to correct it. This is done, in accordance with the present invention, by means now to be described in connection with FIG. 3.

As indicated hereinabove, in the even-parity system of encoding, each binary word contains an even number of spaces and pulses. Thus, a detection error can be readily recognized by counting the number of output pulses produced by each of the two detectors A and B. If this count is not even, it is known that a detection error has been made in a particular word. The particular bit position in error is determined by comparing the outputs from the two detectors. Whenever one detector indicates a space and the other indicates a pulse, no error is indicated. If, on the other hand, both detectors simultaneously indicate a space, an error of omission has been committed by the detector producing an odd number of pulses. This error is then corrected by inserting a pulse in the bit position in error. Similarly, if both detectors simultaneously indicate a pulse, an insertion error has been committed by the detector producing an odd number of pulses. This error is then corrected by deleting the spurious pulse from the bit position in error.

Figure 3:
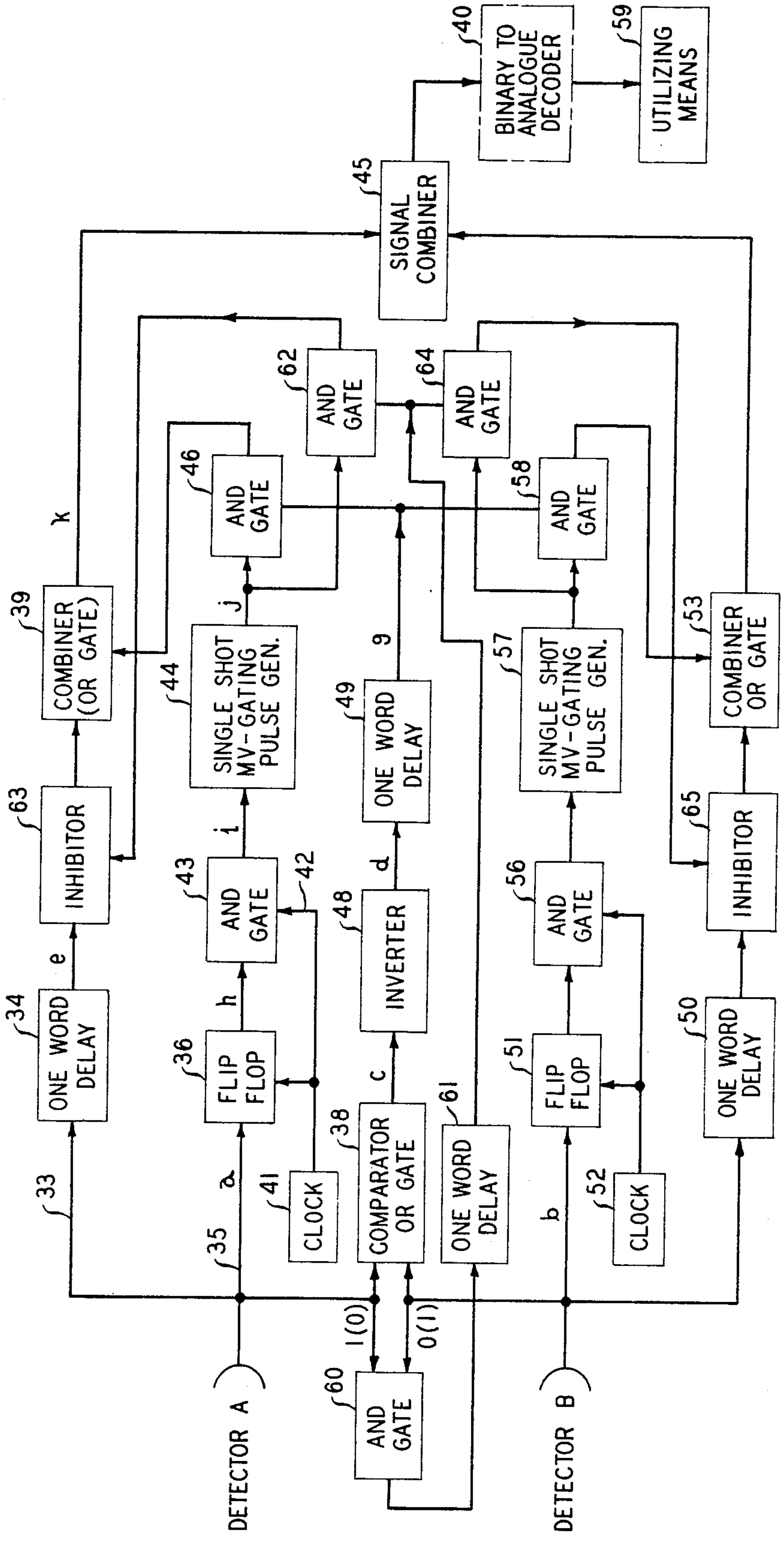
FIG. 3 shows, in block diagram, an error-correcting system in accordance with the present invention.

The error-correction method outlined above, is more completely set forth in the block diagram of FIG. 3. In order to simplify the description of the operation of the error-correction circuit, the case of an error of omission is considered first, and the circuit response to the outputs from detectors A and B are considered separately. In operation, the output signal from detector A is simultaneously applied along a first path 33 to a one-word delay means 34; along a second path 35 to flip-flop 36; and along a third path 37 to "OR" gate 38. Since, after detection, the signal is at baseband, these components can be of the conventional type. In the upper branch, the signal, delayed in time the equivalent of one word, passes along branch *e*, through INHIBITOR 63, to combiner "OR" gate 39 in which omission error correction occurs, and thence along branch *k* to signal combiner 45 in which the output signals from detectors A and B are added together.

The output signal from detector A is simultaneously applied to flip-flop 36, which acts as a binary counter. Flip-flop 36 is set to the same state at the beginning of each word by a reset pulse from clock timer 41. Each signal pulse applied to flip-flop 36 causes it to switch states and the state of the counter at the end of each word is determined by whether an odd or an even number of pulses was present in the applied signal. The pulse used to start counter 36 at the beginning of each word also provides a gating pulse along lead 42 to AND gate 43. If the condition of flip-flop 36 indicates an odd number of ones during the preceding word, an error is present and a pulse of the proper polarity, induced by the reset pulse, appears along branch *h* at the end of the word. This pulse, together with the pulse simultaneously present on lead 42, produces an output from AND gate 43 along branch *i* which activates single-shot multivibrator gating pulse generator 44. This gating pulse is one word long and is applied to AND gate 46. When, on the other hand, the count in flip-flop 36 indicates an even number of ones in the completed frame, no error is present, and neither AND gate 43 nor pulse generator 44 is enabled.

Returning now to the input end of FIG. 3, the signals from detectors A and B are both applied to comparator circuit 38, which can be a simple OR gate. Since the signals derived from detectors A and B are complementary, there will be a pulse output from comparator 38 in every bit position except when a pulse omission error has occurred. By inverting the pulse train on branch *c* in inverter 48, the signal on branch *d* includes a pulse in every bit position in which a pulse omission error has occurred. This error-correcting pulse train is then delayed one word by delay means 49 before being applied to AND gate 46 via branch *g*. AND gate 46 is enabled only when the sequence of operations beginning at flip-flop 36 have indicated the presence of an error in the pulse train. In such a situation, the correction pulse is transmitted through AND gate 46 to combiner 39 where the original signal, also delayed one word, is reconstituted to correct the omission error.

As stated hereinbefore, the signal-to-noise ratio of the system can be improved 3 db by providing a second pulse evaluation and correction arrangement in parallel with the arrangement already described. This parallel circuit is shown in the lower portion of FIG. 3 and, since its operation is substantially identical to that for the output from detector A, it will be only briefly described.

The output from detector B is the complement of the output from detector A. This complementary signal is simultaneously applied to a one-word delay means 50; to a flip-flop 51 which is triggered by a reset pulse from a clock 52; and to a comparator 38. Upon leaving the delay means 50, the signal on branch *f* enters combiner 53 where any necessary error-correcting pulse is introduced.

The pulse from clock 52 also serves to enable AND gate 56, and the presence of a pulse at the output of the gate triggers single-shot multivibrator pulse generator 57 which provides an enabling pulse one word long to AND gate 58. As before, if a pulse omission error is present on branch *g*, a correction pulse passes from AND gate 58 and is inserted in the pulse train at the proper location by combiner 53.

The output from each of combiners 39 and 53 represents a recovered baseband signal free from pulse omission errors. When combined in signal combiner 45, the resultant output has a 3 db better signal-to-noise ratio than either signal alone because the noise in the detector A branch is independent of the noise in detector B branch. The potential power loss introduced by the hybrid in FIG. 2 is therefore avoided.

Figure 4:
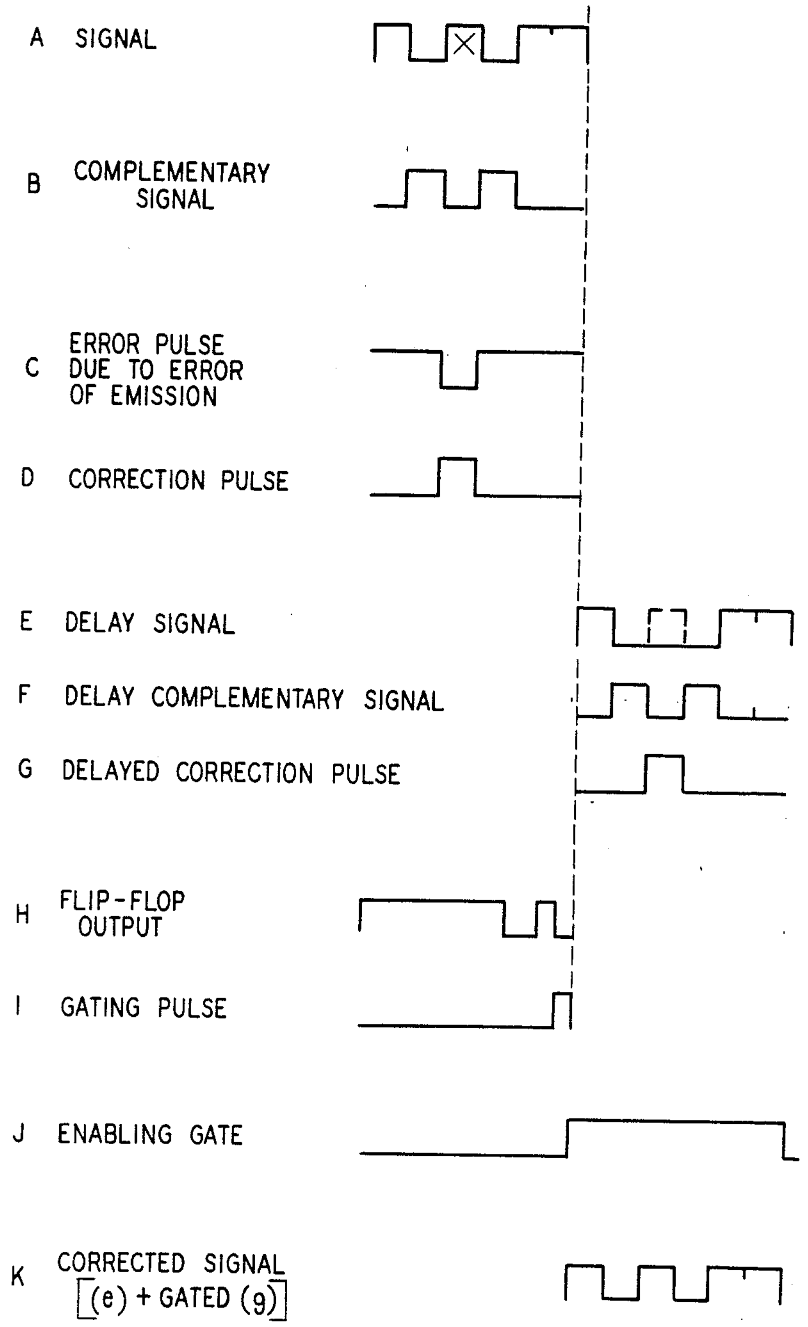
FIG. 4 shows typical signal conditions that might be encountered in the error-correcting detector for the case of a pulse omission, error-correction sequence.

FIG. 4 represents typical signal conditions which might be encountered within the arrangement of FIG. 3 in a pulse omission, error-correction sequence. The various lines of FIG. 4 are lettered *a* through *k* to correspond to the various branch locations within the block diagram of FIG. 3 at which such pulse trains could be found.

The output of detector A is represented by line *a* and the complementary output from detector B by line *b*. The pulse assumed in error is marked with an X, that is, the marked pulse is present at the optical detector input, but not at the detector output. Line *c* is the output of the comparator and shows a space whenever there is an error from either detector. Line *d* is the inverse of line *c* and supplies a pulse whenever there is an error. Lines *e*, *f*, and *g* are replicas of *a*, *b*, and *d*, respectively, each delayed in time the equivalent of one word. Line *h* is the output of the binary counter and indicates an odd number of pulses due to an error in the frame. As a result it produces a gating pulse at the end of the word on line *i*. This pulse trips the multivibrator causing it to generate the enabling pulse on line *j*. The correction pulse on line *g* is then passed through the AND gate to the combining OR gate where it is added to the signal from detector A to produce a corrected pulse train on line *k*.

Thus far the sequence of events has been described for a detection error of omission in which a space is simultaneously provided by both detectors. In the case of a detection error of insertion, now to be described, a pulse is simultaneously produced by both detectors. This occurrence is sensed by an AND gate 60, which generates an output pulse that is coupled to AND gates 62 and 64 through a one-word delay means 61. Concurrently, flip-flops 36 and 51 are counting the pulse produced by the respective detectors A and B to determine which of the two has inserted the spurious pulse. If, for example, the spurious pulse has been inserted by detector B, an enabling pulse is coupled to AND get 64 by gating pulse generator 57. This pulse, along with the delayed output pulse from AND gate 60, causes AND gate 64 to generate a signal during the appropriate bit position. This signal is coupled to an INHIBITOR 65 which blocks transmission of the spurious pulse. Similarly, if the spurious pulse is introduced by detector A, AND gate 62 is activated, causing INHIBiTOR 63 to block transmission during the appropriate bit position.

Having made the appropriate correction, the two pulse trains are combined in signal combiner 45. Depending upon the nature of the utilization means 59, the binary-encoder signal is either used directly, or optionally, a binary-to-analog decoder 40 is included between the signal combiner and the utilization means.

In the discussion hereinabove, it was assumed that a detection error was made by only one of the two detectors. The system, however, is capable of recognizing and correcting one detection error made in the same word by both detectors so long as the errors do not occur in the same bit position. However, if $p_1$ and $p_2$ are the probabilities of a detection error being made in any bit position by the respective detectors, the probability of both detectors making an error in the same bit position is given by the product $p_1p_2$ of the individual probabilities and, hence, is negligibly small. Thus, in a practical sense, the probability of one error being made per word in the above-described system is essentially zero. It should be noted, on the other hand, that for this system there would be an uncorrected or residual error whenever either detector made two or more errors in the same word.

While the invention has been described using $\pi$-modulation for the optical carrier, it is readily apparent that other types of modulation, such as polarization modulation, could just as readily have been used. This would, of course, necessitate a modification of the receiver input circuit in order to obtain the two complementary optical signals. However, in all other respects receiver 11 would be as described. Thus, in all cases it is understood that the above-described arrangement is merely illustrative of but one of the many possible specific embodiments which can represent applications of the principles of the invention. Numerous and varied other arrangements can readily be devised in accordance with these principles by those skilled in the art without departing from the spirit and scope of the invention.

I claim:

1. An optical communication system comprising a transmitter and a receiver, wherein:

said transmitter includes:

an optical wave, phase modulator;

a source of optical wave energy whose output is directed through said modulator;

and an even-parity, binary encoded signal source coupled to said modulator;

characterized in that said optical wave is $\pi$-modulated in response to said binary signal;

and said receiver includes:

means for combining said $\pi$-modulated optical wave energy with a beating local oscillator optical signal of the same frequency to produce two, complementary, on-off pulse trains wherein the signals in corresponding time slots of said two trains are in opposite binary states;

means for comparing said complementary pulse trains and detecting errors therein;

and means for correcting said errors by inserting a missing pulse or by deleting a spurious pulse in any binary word having an odd number of pulses.

2. An optical detection and error-correcting system, for use with even-parity, binary-encoded optical signals, comprising:

means for converting said optical signals into two, complementary, on-off type binary-encoded optical signals;

separate photoresponsive means for independently detecting said signals and, thereby, producing two complementary, on-off baseband pulse trains;

means for independently counting the number of pulses per binary word in each of said pulse trains;

means for comparing said pulse trains on a bit-by-bit basis for recognizing detection errors;

and means responsive to said counting means and said comparing means for correcting said detection errors by inserting a missing pulse, or by deleting a spurious pulse in any binary word having an odd number of pulses.

* * * * *